(12) United States Patent
Ahn et al.

(10) Patent No.: US 10,473,960 B2
(45) Date of Patent: Nov. 12, 2019

(54) DISPLAY APPARATUS

(71) Applicant: SAMSUNG ELECTRONICS CO., LTD., Suwon-si (KR)

(72) Inventors: Joon Seok Ahn, Suwon-si (KR); Jun-Mo Yoo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 47 days.

(21) Appl. No.: 15/478,319

(22) Filed: Apr. 4, 2017

(65) Prior Publication Data

US 2017/0315400 A1 Nov. 2, 2017

(30) Foreign Application Priority Data

Apr. 29, 2016 (KR) .................. 10-2016-0052881

(51) Int. Cl.
*G02F 1/1333* (2006.01)
*F21V 8/00* (2006.01)
*G02F 1/1335* (2006.01)

(52) U.S. Cl.
CPC ..... *G02F 1/133308* (2013.01); *G02B 6/0085* (2013.01); *G02F 1/133615* (2013.01); *G02B 6/009* (2013.01); *G02B 6/0051* (2013.01); *G02B 6/0088* (2013.01); *G02F 2001/13332* (2013.01); *G02F 2001/133314* (2013.01); *G02F 2001/133628* (2013.01)

(58) Field of Classification Search
CPC .............. G02F 1/133308; G02F 1/133615
USPC ....................................................... 362/606
See application file for complete search history.

(56) References Cited

U.S. PATENT DOCUMENTS 5,422,751 A * 6/1995 Lewis ............... G02F 1/133308
349/59
6,315,440 B1 * 11/2001 Satoh ................... G02B 6/0018
349/65

(Continued)

FOREIGN PATENT DOCUMENTS

CN 102506391 A 6/2012
KR 1998079559 A 11/1998

(Continued)

OTHER PUBLICATIONS

Search Report dated Jul. 13, 2017, issued by the International Searching Authority in counterpart International Patent Application No. PCT/KR2017/003329 (PCT/ISA/210).

(Continued)

*Primary Examiner* — Bryon T Gyllstrom
(74) *Attorney, Agent, or Firm* — Sughrue Mion, PLLC

(57) ABSTRACT

The present invention relates to a display apparatus that does not include a middle mold and a rear chassis, and is capable of supporting an internal configuration of a display apparatus such as a display panel and a light guide plate with only a front chassis and a rear cover. It is possible to effectively dissipate heat by including a separate heat sink. In addition, heat generated from the electrical component substrate can be dissipated through the plate coupled to the electrical component substrate, the electromagnetic wave can be shielded, and the heat sink and the plate can be connected to improve the heat dissipation and electromagnetic wave shielding efficiency.

19 Claims, 16 Drawing Sheets

(56) References Cited

U.S. PATENT DOCUMENTS

| | | | |
|---|---|---|---|
| 6,593,979 B1* | 7/2003 | Ha | G02F 1/133308 349/187 |
| 8,970,793 B2* | 3/2015 | Yokawa | H04R 1/028 348/553 |
| 2006/0146223 A1* | 7/2006 | Iwai | G02F 1/133308 349/58 |
| 2006/0243948 A1* | 11/2006 | Ishiwa | G02B 6/0085 252/299.61 |
| 2006/0290836 A1 | 12/2006 | Chang | |
| 2007/0165424 A1* | 7/2007 | Sakai | G02B 6/0055 362/633 |
| 2009/0096957 A1* | 4/2009 | Hiyama | G02B 6/003 349/65 |
| 2009/0128730 A1* | 5/2009 | Hsu | G02F 1/133308 349/58 |
| 2009/0180049 A1* | 7/2009 | Lee | G09F 9/35 349/58 |
| 2010/0246209 A1* | 9/2010 | Park | G02B 6/0083 362/606 |
| 2010/0321606 A1* | 12/2010 | Liou | G06F 1/1601 349/60 |
| 2013/0094246 A1 | 4/2013 | Kim et al. | |
| 2013/0215356 A1* | 8/2013 | Yu | G02B 6/0088 349/58 |
| 2013/0314638 A1 | 11/2013 | Ahn et al. | |
| 2015/0049255 A1 | 2/2015 | Terashima | |
| 2015/0116598 A1 | 4/2015 | Myojo | |
| 2015/0131026 A1 | 5/2015 | Chen et al. | |

FOREIGN PATENT DOCUMENTS

| | | |
|---|---|---|
| KR | 1020050065020 A | 6/2005 |
| KR | 10-2006-0084247 A | 7/2006 |
| KR | 1020150026056 A | 3/2015 |

OTHER PUBLICATIONS

Communication dated Dec. 6, 2018, issued by the European Patent Office in counterpart European Application No. 17789794.9.

Communication dated Jul. 2, 2019, issued by the European Patent Office in counterpart European Application No. 17789794.9.

\* cited by examiner

DISPLAY APPARATUS

CROSS-REFERENCE TO RELATED APPLICATION

This application claims priority from Korean Patent Application No. 10-2016-0052881, filed on Apr. 29, 2016 in the Korean Intellectual Property Office, the disclosure of which is incorporated herein by reference.

BACKGROUND

1. Field

Embodiments of the present disclosure relate to a display apparatus in which a chassis is improved.

2. Description of the Related Art

Generally, a display apparatus is an apparatus configured to display a screen and includes examples such as a monitor or a television set. A display apparatus uses a self-luminous display panel such as an organic light emitting diode (OLED) panel or a light-receiving display panel such as a liquid crystal display (LCD) panel.

A light-receiving display panel may include a display panel formed with an LCD and a backlight unit disposed behind the display panel. In addition, the display panel may include components such as an optical sheet, a light guide plate, and the like configured to reflect or modulate light emitted from the backlight unit toward the display panel.

These components may be supported by a chassis that includes a front chassis, a rear chassis, and a middle mold interposed between the front chassis and the rear chassis.

As display devices become increasingly slimmer, having both the middle mold and the rear chassis described above may cause problems such as increase in thickness of the display apparatus and higher manufacturing cost.

SUMMARY

One or more exemplary embodiments provide a display apparatus in which components, such as a display panel, are supported by a front chassis and a rear cover without a middle mold and a rear chassis.

Also provided is a display apparatus which includes a heat sink disposed between a front chassis and a rear cover to dissipate heat.

Additional aspects of the disclosure will be set forth in part in the description which follows and, in part, will be obvious from the description, or may be learned by practice of the disclosure.

In accordance with one aspect of an exemplary embodiment, a display apparatus may include a display panel, a front chassis provided in front of the display panel, an optical sheet disposed behind the display panel and supported by the front chassis, a light guide plate disposed behind the optical sheet, a light emitting diode (LED) substrate disposed beside the light guide plate and configured to emit light toward the light guide plate, a rear cover configured to form an exterior of the display panel, coupled to a rear side of the front chassis, and configured to press the light guide plate toward the front chassis, and a heat sink connected to the LED substrate to dissipate heat generated by the LED substrate and disposed between the light guide plate and the rear cover.

The rear cover may be composed of a plastic material.

The heat sink may be provided in a plate shape having a first dimension extending in a direction corresponding to a longitudinal direction of the LED substrate and a second dimension having a shorter length than the first dimension.

An area of the heat sink may be smaller than that of the light guide plate.

The display apparatus may further include a reinforcing member coupled to the rear cover to reinforce strength of the rear cover, and at least one side of the reinforcing member is in contact with the heat sink.

The rear cover may include a plurality of ribs configured to protrude toward the front chassis and press the light guide plate toward the front chassis so that the light guide plate is supported by the front chassis.

The front chassis includes a hook configured to protrude toward the optical sheet to hook the optical sheet, and the optical sheet includes a hook hole so that the hook passes through the hook hole.

The display apparatus may further include a reflective sheet provided behind the light guide plate, and the reflective sheet may be hooked by the hook and supported by the front chassis.

The front chassis may include a light guide plate support configured to protrude toward the light guide plate and support the light guide plate, and the light guide plate support may protrude to a length corresponding to a combined thickness of the display panel and the optical sheet.

The front chassis may include an insertion protrusion configured to protrude toward the heat sink and support the heat sink, and the heat sink may include an insertion groove to accommodate the insertion protrusion for coupling the heat sink to the front chassis.

The display apparatus may further include an electrical component substrate on which an electrical component is mounted, and the electrical component substrate is coupled to the rear cover.

A coupling plate may be provided to have an area corresponding to that of the electrical component substrate is provided at one side of the electrical component substrate.

The electrical component substrate may be disposed between the light guide plate and the rear cover.

The electrical component substrate may be disposed behind the rear cover; and the rear cover includes an auxiliary cover configured to cover the electrical component substrate.

The coupling plate may be connected to the heat sink.

In accordance with one aspect of an exemplary embodiment, a display apparatus may include a display panel, a front chassis provided in front of the display panel, a rear cover provided behind the display panel and coupled to the front chassis, an optical sheet and a light guide plate provided between and supported by the front chassis and the rear cover, a light emitting diode (LED) substrate disposed beside the light guide plate to emit light toward the light guide plate, a heat sink connected to the LED substrate to dissipate heat generated by the LED substrate, and a reinforcing member coupled to the rear cover and connected to the heat sink to reinforce strength of the rear cover.

The display apparatus may further include an electrical component substrate coupled to the rear cover. An electrical component may be mounted on the electrical component substrate, and a coupling plate, configured to reduce electromagnetic waves generated by the electrical component substrate, may be disposed at one side of the electrical component substrate.

The coupling plate may be connected to at least one of the heat sink and the reinforcing member.

The front chassis and the rear cover may be coupled to each other via a hook.

In accordance with one aspect of an exemplary embodiment, a display apparatus may include a display panel, a chassis provided in front of the display panel, a rear cover configured to form an exterior of the display panel, coupled to the chassis at a rear of the display panel, and including a plastic material, a light guide plate supported by the chassis and the rear cover, a light emitting diode (LED) substrate configured to emit light toward the light guide plate, and a plate connected to the LED substrate, interposed between the display panel and the rear cover, and including a metallic material.

BRIEF DESCRIPTION OF THE DRAWINGS

The above and/or other aspects of the disclosure will become apparent and more readily appreciated from the following description of the embodiments, taken in conjunction with the accompanying drawings of which:

FIG. 5 is a rear view of a front chassis and a partial configuration of a display device according to an exemplary embodiment of;

FIG. 6 is a rear view of a front chassis and a partial configuration of a display device according to an exemplary embodiment of;

DETAILED DESCRIPTION

Figure 1:
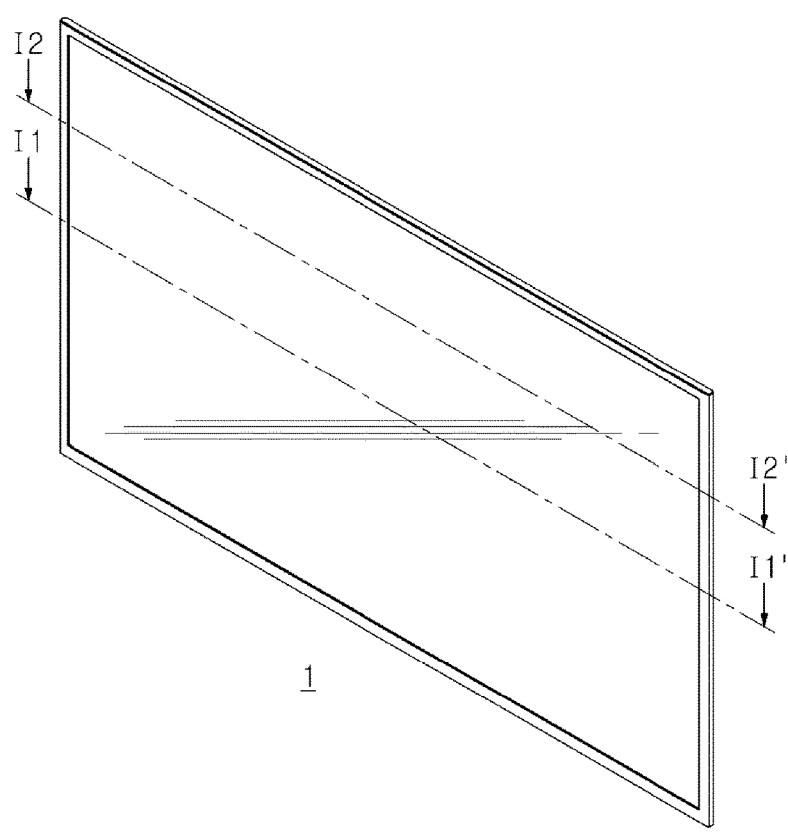
FIG. 1 is a perspective view of a display device according to an embodiment of the present invention.

Embodiments described in this specification and configurations illustrated in drawings are only exemplary examples of the disclosed disclosure. The disclosure covers various modifications that may be substituted for the embodiments and drawings herein at the time of filing of this application.

In addition, the same reference numerals or symbols refer to parts or elements that perform substantially the same function.

In addition, terms used in the present specification are merely used to describe exemplary embodiments and are not intended to limit and/or restrict the embodiments. An expression used in the singular encompasses the expression of the plural unless it has a clearly different meaning in context. In the present specification, the terms such as "including," "having," and "comprising" are intended to indicate the presence of the features, numbers, steps, actions, elements, parts, or combinations thereof disclosed in the specification, and are not intended to preclude the possibility that one or more other features, numbers, steps, actions, elements, parts, or combinations thereof may be present or added.

In addition, it should be understood that although the terms "first," "second," etc. may be used herein to describe various elements, the elements should not be limited by these terms. These terms are only used to distinguish one element from another. For example, a first element could be termed a second element, and, similarly, a second element could be termed a first element without departing from the scope of the present disclosure. As used herein, the term "and/or" includes any and all combinations of one or more of the associated listed items.

Hereinafter, embodiments of the present disclosure will be described with reference to the accompanying drawings in detail.

Hereinafter, a front surface and a forward direction refer to a surface and a direction pointing to the front of a display apparatus 1 illustrated in FIG. 1, and a rearward direction refers to a direction pointing to the back of the display apparatus 1.

Although embodiments of the present disclosure will be described with a flat display apparatus 1 as an example, the embodiments of the present disclosure may also be applied to a curved display apparatus or a bendable or flexible display apparatus capable of switching between a curved state and a flat state.

In addition, the embodiments of the present disclosure may be applied to all display apparatuses 1 regardless of a screen size thereof. For example, the embodiments of the present disclosure may also be applied to a product such as a smart television and a monitor, which may be installed on a table, a wall, and a ceiling, and a portable product such as a tablet, a notebook, a smart phone, and an ebook reader.

Figure 2:
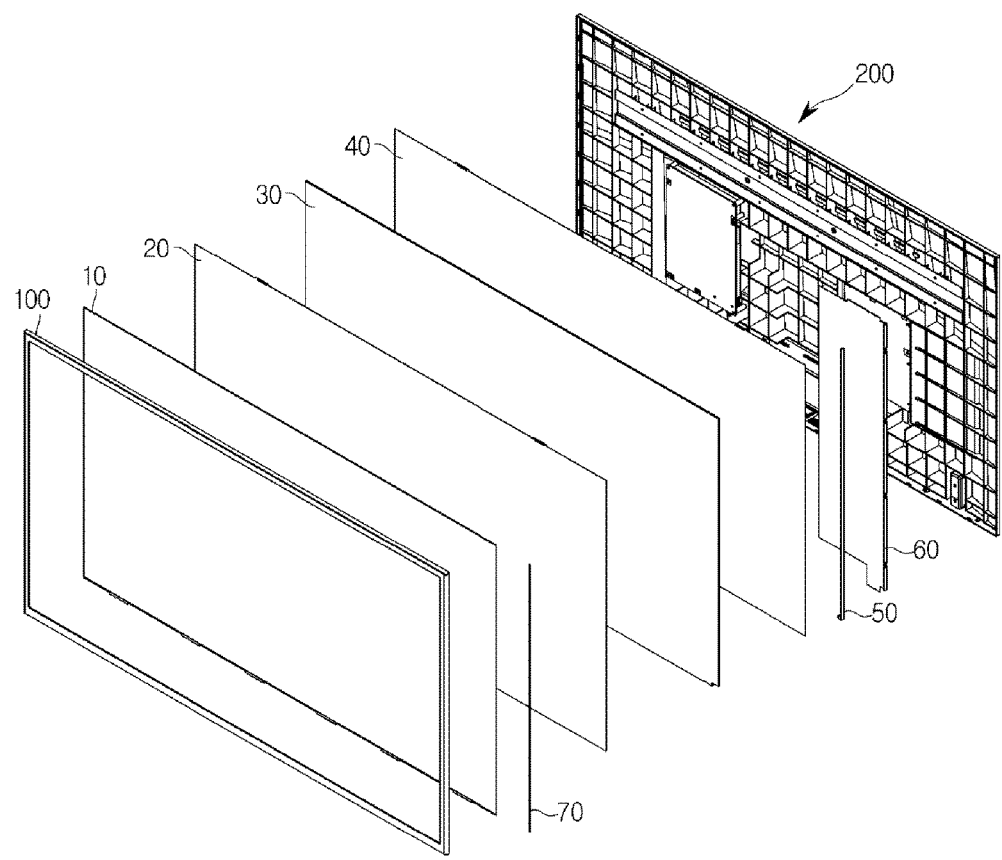
FIG. 2 is an exploded perspective view of a display device according to an embodiment of the present invention.

FIG. 1 is a perspective view illustrating a display apparatus according to an exemplary embodiment, and FIG. 2 is an exploded perspective view illustrating the display apparatus according to an exemplary embodiment.

The display apparatus 1 may include a display panel 10 configured to display an image, a light guide plate 30 disposed behind the display panel 10 and configured to transmit light transmitted from a rear side of the light guide plate 30 to the display panel 10 disposed in front of the light guide plate 30, and an optical sheet 20 provided between the display panel 10 and the light guide plate 30 and configured to improve optical characteristics of the light transmitted by the light guide plate 30.

The display panel 10 may include a liquid crystal panel formed of liquid crystals inserted and sealed between two glass substrates each provided with an electrode.

The optical sheet 20 may include a diffusion sheet configured to diffuse the light transmitted through the light guide plate 30, a prism sheet configured to collect the diffused light in a direction perpendicular to the display panel 10, a protective sheet configured to protect the prism sheet, and the like.

In addition, the display apparatus 1 may include a light emitting diode (LED) substrate 50 disposed at one side of the light guide plate 30 and including a light source configured to emit light toward the light guide plate 30. A light source 51 (see FIG. 3) may be a point light source which may be thinned due to a thin screen and include an LED. However, the light source is not limited to the LED, and may include another component capable of emitting light.

A plurality of light sources 51 may be disposed on the LED substrate 50 to be spaced apart from each other in a longitudinal (i.e., vertical) direction of the LED substrate 50.

In one embodiment of the present disclosure, the LED substrate 50 may be disposed at one side of the light guide plate 30. Here, the LED substrate 50 may extend to a length corresponding to a length of the side of the light guide plate 30 of the LED substrate 50. That is, the LED substrate 50 may extend to a length corresponding to a vertical length of the light guide plate 30.

However, the LED substrate 50 is not limited thereto and may be disposed at a lower or upper side of the light guide plate 30. Here, the LED substrate 50 may extend to a length corresponding to a horizontal length of the light guide plate 30.

Figure 3:
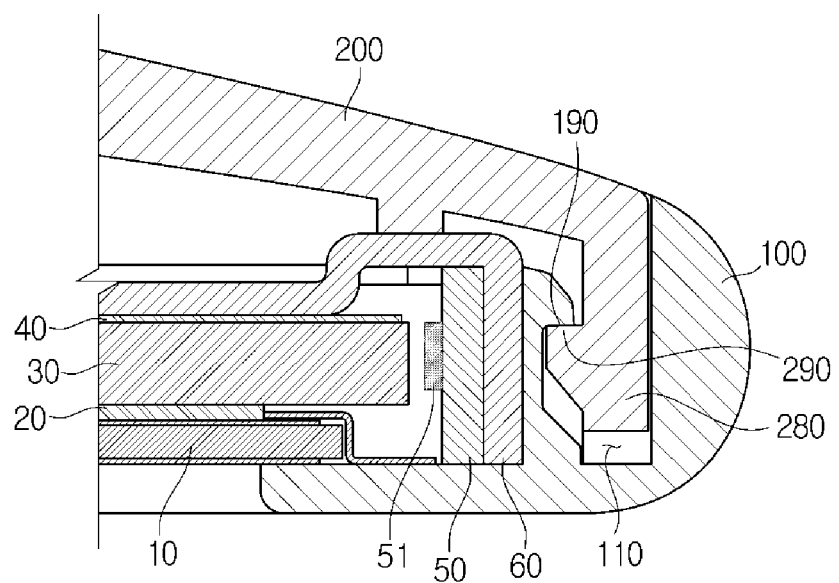
FIG. 3 is a side cross-sectional view taken along the line I1-I1 shown in FIG. 1.

In addition, unlike an exemplary embodiment shown in FIG. 3, LED substrates 50 may be disposed at both sides of the light guide plate 30. The LED substrates 50 may be disposed at one side and the other side of the light guide plate 30 to emit light from both sides of the light guide plate 30.

The display apparatus 1 may include a heat sink 60 in contact with the LED substrate 50 and disposed behind the light guide plate 30. The heat sink 60 will be described below in detail.

The display apparatus 1 may include a reflective sheet 40 disposed behind the light guide plate 30 and configured to reflect light emitted toward a rear side of the light guide plate in a forward direction and further towards the front of the light guide plate 30.

Hereinafter, a state in which the above-described components are supported by a front chassis 100 and a rear cover 200 will be described in detail.

Figure 4:
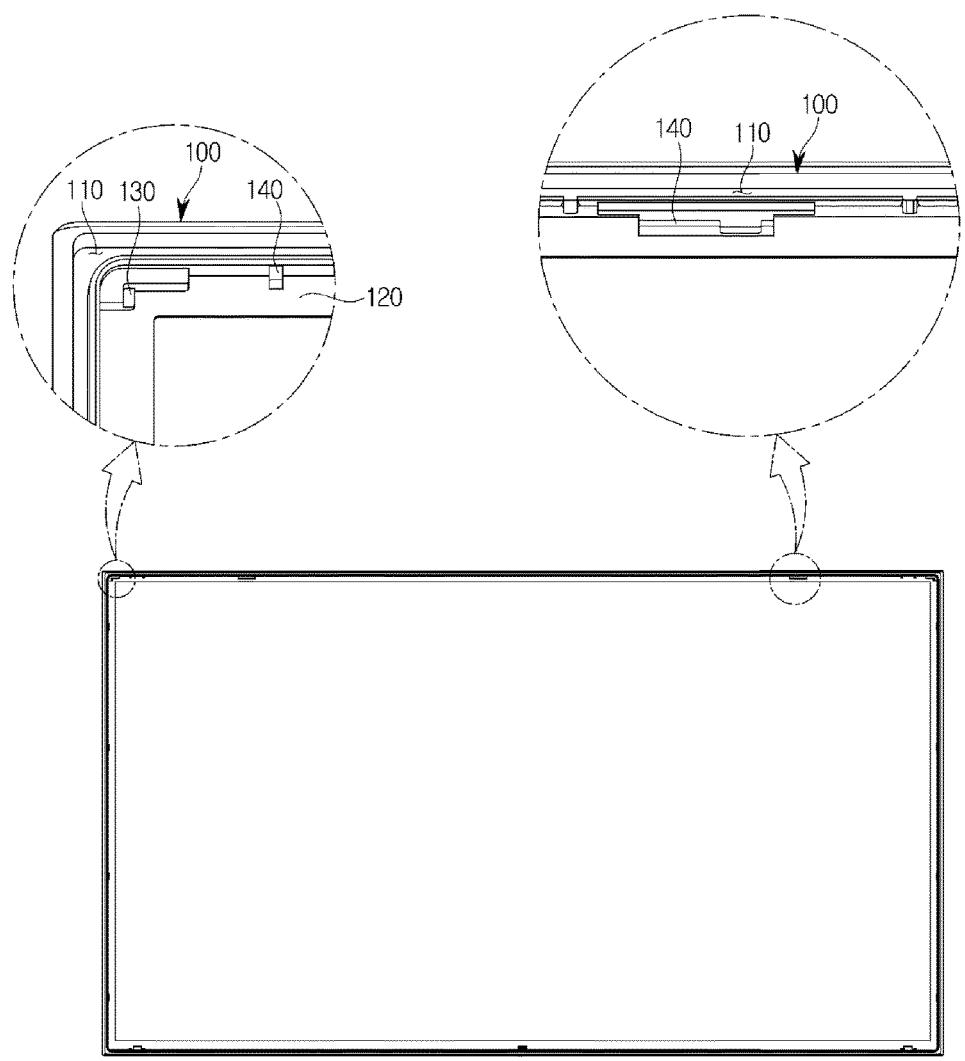
FIG. 4 is a rear view of a front chassis of a display device according to an exemplary embodiment.
Figure 5:
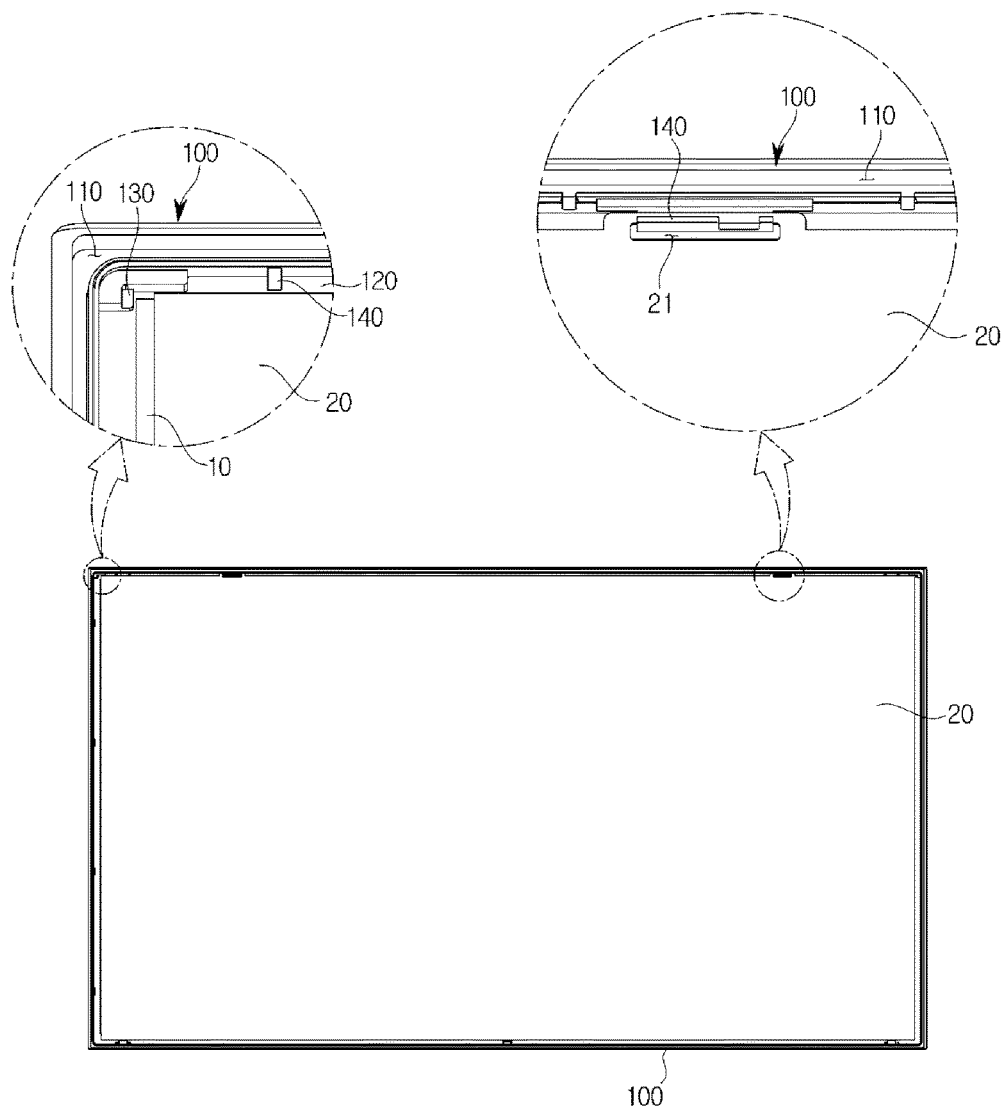
Figure 6:
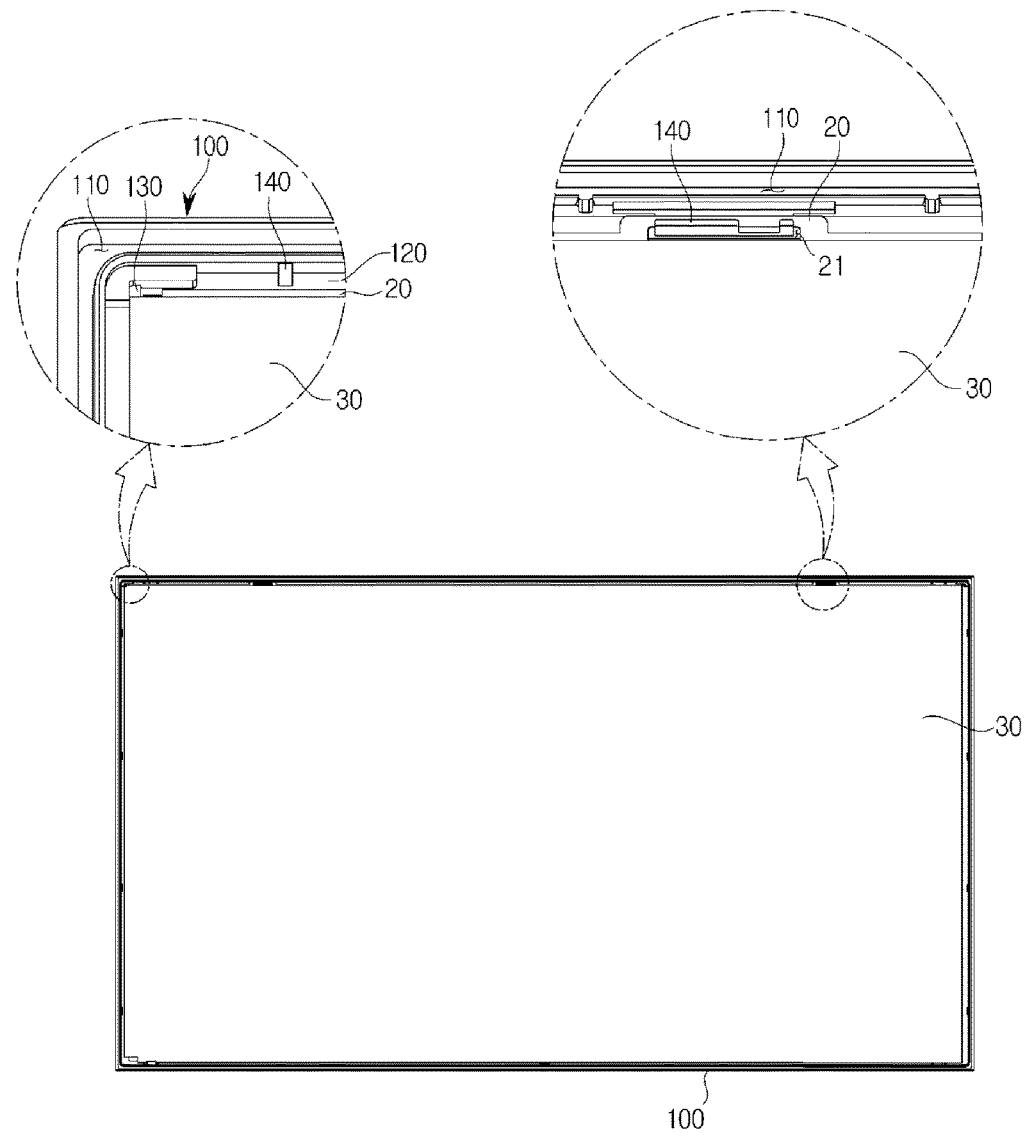
Figure 7:
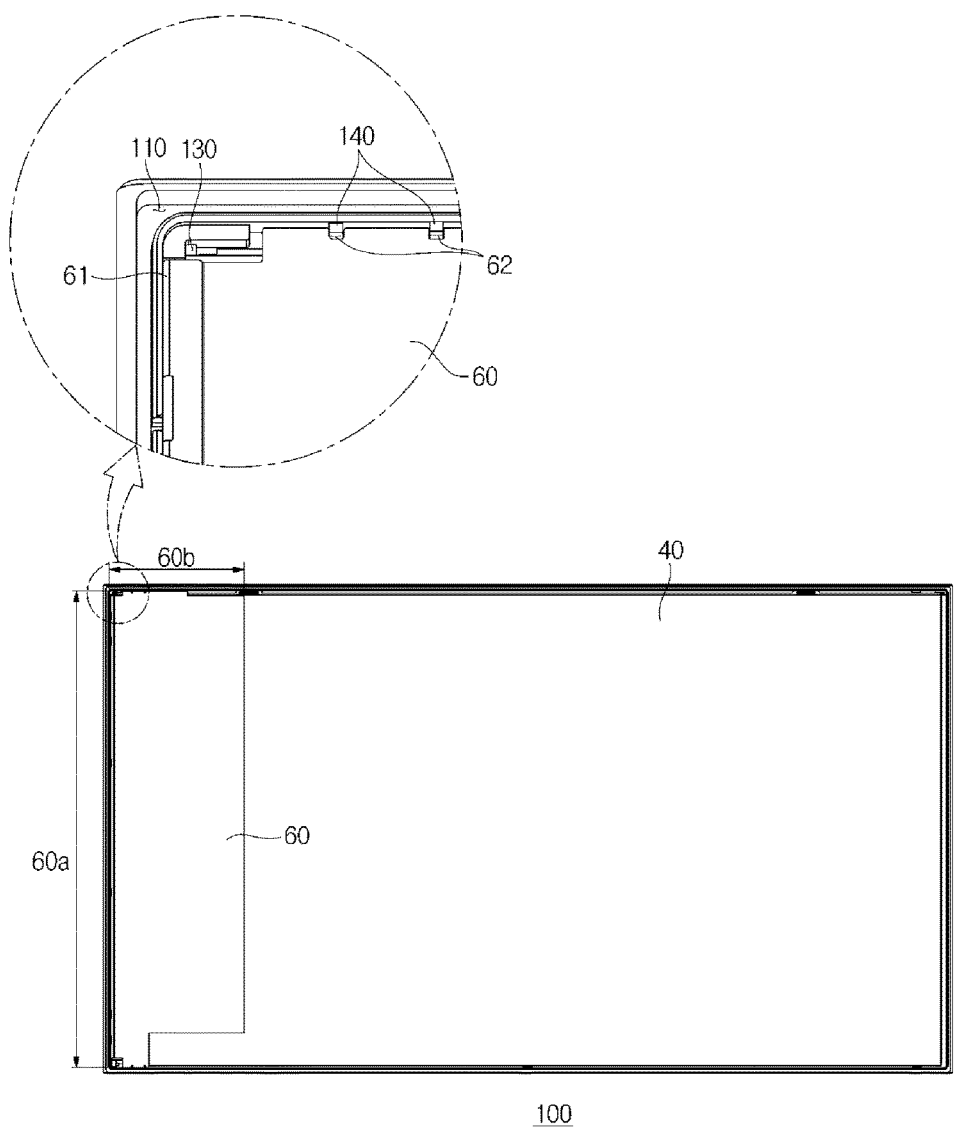
FIG. 7 is a rear view of a front chassis and a partial configuration of a display device according to an exemplary embodiment.

FIG. 3 is a cross-sectional side view taken along line I1-I1' of FIG. 1, FIG. 4 is a rear view illustrating a front chassis of the display apparatus according to an exemplary embodiment, FIG. 5 is a rear view illustrating the front chassis and some components of the display apparatus according to an exemplary embodiment, FIG. 6 is a rear view illustrating the front chassis and some components of the display apparatus according to an exemplary embodiment, and FIG. 7 is a rear view illustrating the front chassis and some components of the display apparatus according to an exemplary embodiment.

In a conventional display apparatus, components, such as the display panel, the optical sheet, the light guide plate, the LED substrate, and the reflective sheet, which are described above, are supported by a chassis that includes a front chassis, a bottom chassis, and a middle mold.

Because the middle mold and the bottom chassis are typically formed of aluminum, and specifically the bottom chassis is formed in a plate shape having a size corresponding to an area of a display panel, the cost of the display apparatus increases, and because the middle mold and the bottom chassis are provided inside a cover configured to form an exterior of the display apparatus, the thickness of the display apparatus also increases.

In order to solve the above problems, one or more exemplary embodiments may exclude a middle mold and a rear chassis and may be provided with components including the display panel 10, the optical sheet 20, the light guide plate 30, the LED substrate 50, and the reflective sheet 40 to be supported by the front chassis 100 and the rear cover 200.

That is, a chassis of the display apparatus 1 according to an aspect of an exemplary embodiment may include only one front chassis 100. Accordingly, although it is apparent that the front chassis 100 is referred to as a chassis, the front chassis 100 is referred to as such for the sake of convenience in the description.

As illustrated in FIGS. 3 and 4, components including the display panel 10, the optical sheet 20, the light guide plate 30, the LED substrate 50, and the reflective sheet 40 may be interposed between the front chassis 100 and the rear cover 200. Specifically, the display panel 10, the optical sheet 20, the light guide plate 30, and the reflective sheet 40 may be sequentially disposed at a rear side surface of the front chassis 100. Thus, for example, the front chassis 100 may be a bezel that covers the edges of the display panel 10 and wraps around the edges of the internal components of the display apparatus 1.

A first support 120 in contact with and configured to support the display panel 10 may be provided at the rear side surface of the front chassis 100. The first support 120 may be provided along an edge of an opening of the front chassis 100. An edge of the display panel 10 may be in contact with the first support 120 and be supported by the front chassis 100.

The optical sheet 20, the light guide plate 30, and the reflective sheet 40 may be sequentially disposed behind the display panel 10 to overlap each other, so that the display panel 10, the optical sheet 20, the light guide plate 30, and the reflective sheet 40 may be pressed toward the front chassis 100 by the rear cover 200 provided behind the light guide plate 30 and the reflective sheet 40 and supported by the front chassis 100.

That is, in a state in which the display panel 10, the optical sheet 20, the light guide plate 30, the LED substrate 50, and the reflective sheet 40 are supported by the front chassis 100, when the front chassis 100 and the rear cover 200 are hook-coupled to each other, the rear cover 200 presses the display panel 10, the optical sheet 20, the light guide plate 30, the LED substrate 50, and the reflective sheet 40 toward the front chassis 100 to fix the positions of and stabilize components including the display panel 10, the optical sheet 20, the light guide plate 30, the LED substrate 50, and the reflective sheet 40 between the front chassis 100 and the rear cover 200.

The rear cover 200 may be coupled to a rear side of the front chassis 100. Specifically, an insertion groove 110 into which the rear cover 200 is inserted is provided in a rear surface of the front chassis 100, and an insertion portion 280 formed along an edge of a front surface of the rear cover 200 may be inserted into and coupled to the insertion groove 110.

A first hook 190 and a second hook 290 may be respectively provided at the insertion groove 110 and the insertion portion 280 so that the rear cover 200 is inserted into and hook-coupled to the front chassis 100 in a locked position. For example, the front chassis and the rear cover may be coupled to each other through a screw-less interlocking mechanism. When a predetermined portion of the insertion portion 280 is inserted into the insertion groove 110, the first hook 190 and the second hook 290 are hook-coupled to each other and the front chassis 100 and the rear cover 200 may be locked to each other.

However, the front chassis 100 and the rear cover 200 are not limited thereto and may be coupled by screw-coupling or the like.

As described above, the display panel 10 is primarily supported by the edge of the front chassis 100 being in contact with the first support 120, and as illustrated in FIG. 5, the optical sheet 20 may be disposed behind the display panel 10.

The optical sheet 20 may be stacked and interposed between the display panel 10 and the light guide plate 30 to be supported thereby, and at this time, the optical sheet 20 may be hooked to a hook 140 configured to protrude from the rear surface of the front chassis 100 to be held in place by the front chassis 100.

Specifically, a hook hole 21 having a size corresponding to a size of the hook 140 may be provided at an upper portion of the optical sheet 20. The hook hole 21 may be hooked by and fixed to the hook 140. For example, two hooks 140 and two hook holes 21 may be provided, but the disclosure is not limited thereto, and one or three or more hooks 140 and corresponding hook holes 21 may be provided.

As illustrated in FIG. 6, the light guide plate 30 is disposed behind the optical sheet 20 and may be supported by the front chassis 100. Specifically, the light guide plate 30 is stacked and disposed with the display panel 10 and the optical sheet 20, is in contact with a second support 130 provided behind the front chassis 100, and may be supported by the front chassis 100.

The second support 130 may be provided to protrude rearward from a corner of the rear surface of the front chassis 100. The second support 130 may protrude to a length corresponding to a thickness of the display panel 10 and the optical sheet 20.

When the light guide plate 30 is stacked and disposed with the display panel 10 and the optical sheet 20, the second support 130 protrudes rearward as much as a distance occurring between the front chassis 100 and the light guide plate 30 due to the thickness of the display panel 10 and the optical sheet 20, the light guide plate 30 may be in direct contact with the front chassis 100 and supported by the front chassis 100, and the light guide plate 30 may be stably supported thereby.

The reflective sheet 40 may be stacked and disposed behind the light guide plate 30. The reflective sheet 40 may include a hook groove corresponding to the hook 140 like the optical sheet 20, as seen in FIG. 2. The reflective sheet 40 may be stacked and interposed between the light guide plate 30 and the rear cover 200, and may be simultaneously hooked by the hook 140 like the optical sheet 20 and supported by the front chassis 100.

The heat sink 60 may be disposed behind the reflective sheet 40. The heat sink 60 is in contact with the LED substrate 50 and may be supported by the front chassis 100 along with the LED substrate 50. However, the heat sink 60 is not limited thereto, and the LED substrate 50 and the heat sink 60 may be inserted into the rear cover 200 or coupled to the rear cover 200 to be supported by the rear cover 200. The heat sink 60 will be described in detail below.

A shielding member 70 may be disposed at one side of the first support 120. Specifically, the shielding member 70 may be disposed at a side of the first support 120 at which the LED substrate 50 is in contact with the first support 120.

The shielding member 70 is for preventing light emitted from the light source 51 from being emitted directly toward the outside without passing through the light guide plate 30 by being emitted between the display panel 10 and the front chassis 100, and is for preventing the LED substrate 50 from being exposed to a space between the display panel 10 and the front chassis 100.

Accordingly, the shielding member 70 may be disposed between the LED substrate 50 and the opening of the front chassis 100. According to an exemplary embodiment, the shielding member 70 may be disposed at a side surface of the display panel 10 to prevent the LED substrate 50 from being exposed to the outside, as shown in FIG. 2.

In a conventional display apparatus, an LED substrate is prevented from being exposed to the outside by a middle mold, but according to an aspect of an exemplary embodiment of the present disclosure, the LED substrate 50 is prevented from being exposed to the outside by the shielding member 70 because a middle mold is excluded from the display apparatus as described above.

The rear cover 200 may be disposed behind the reflective sheet 40 and the heat sink 60 to be hook-coupled to the front chassis 100 as described above. The rear cover 200 may include a plurality of ribs 210 configured to protrude in a forward direction (see FIGS. 2 and 9).

Because the rear cover 200 is hook-coupled to the front chassis 100, the plurality of ribs 210 configured to protrude from the rear cover 200 may press the heat sink 60, the LED substrate 50, the reflective sheet 40, the light guide plate 30, the optical sheet 20, and the display panel 10 toward the front chassis 100.

Accordingly, the display panel 10, the optical sheet 20, the light guide plate 30, the reflective sheet 40, the LED substrate 50, and the heat sink 60, which are stacked and disposed, may be supported by and fixed to the front chassis 100 at a front of the display apparatus 1 and the rear cover 200 at a rear of the display apparatus.

Hereinafter, the heat sink will be described in detail.

Figure 8:
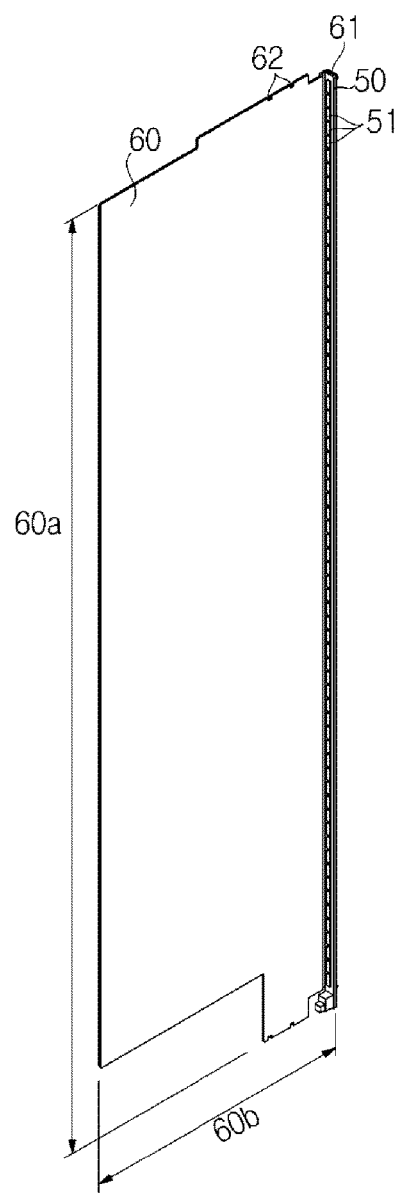
FIG. 8 is a perspective view of an LED substrate and a heat sink of a display device according to an exemplary embodiment.

FIG. 7 is a rear view illustrating the front chassis and some components of the display apparatus according to an exemplary embodiment, and FIG. 8 is a perspective view illustrating the LED substrate and the heat sink of the display apparatus according to an exemplary embodiment.

In a conventional display apparatus, because a rear chassis is formed of aluminum, and the rear chassis and an LED substrate are disposed to be in contact with each other, heat generated by the LED substrate may be dissipated through the rear chassis. Accordingly, although an additional heat sink is not disposed in the conventional display apparatus due to the rear chassis, one or more exemplary embodiments of the present disclosure may include a component configured to dissipate heat generated by the LED substrate 50 because the rear chassis described above is excluded therefrom. Accordingly, the display apparatus 1 may include the heat sink 60 in contact with the LED substrate 50 and configured to dissipate the heat generated by the LED substrate 50.

Specifically, the heat sink 60 may be provided in a plate shape interposed between the light guide plate 30 or the reflective sheet 40 and the rear cover 200. The heat sink 60 may include a metallic material, such as aluminum which has an excellent heat dissipation characteristic.

The heat sink 60 may be disposed to be in contact with a rear side of the LED substrate 50, that is, a surface opposite the surface on which the light source 51 is mounted. One end of the heat sink 60 may include a contact surface 61 bent to be in contact with the rear side of the LED substrate 50.

Because the contact surface 61 is in contact with a rear surface of the LED substrate 50, the heat generated by the LED substrate may be transmitted to the entire heat sink 60 through the contact surface 61 to be easily dissipated. The contact surface 61 may be bent to be perpendicular to a plate of the heat sink 60 and may extend as much as a width of the rear surface of the LED substrate 50.

The heat sink 60 may be formed in a plate shape including a first dimension 60a and a second dimension 60b. The first dimension 60a may have a length corresponding to a longitudinal length of the LED substrate 50, and the second dimension 60b may have a length less than that of the first dimension 60a.

When the length of the second dimension 60b is greater than that of the first dimension 60a, an area of the heat sink 60 is increased so that the heat sink 60 may be provided to have a size similar to that of a conventional rear chassis. In this case, however, the manufacturing cost for the heat sink 60 may increase.

Accordingly, the first dimension 60a of the heat sink 60 may extend to a length corresponding to a length of the LED substrate 50 so that the heat sink 60 is in sufficient contact with the LED substrate 50, and the second dimension 60b may be formed to have a length less than that of the first dimension 60a to effectively reduce a cost thereof.

Similarly, the heat sink 60 may have an area less than that of the display panel 10 or the light guide plate 30 because a cost of the display apparatus 1 increases when the area of the heat sink 60 also increases, as described above.

The heat sink 60 may preferably have an area of one third or less of the area of the light guide plate 30. The area of the heat sink 60 is not limited thereto, and is preferably minimized as much as possible while securing sufficient heat dissipation according to an amount of heat generated by the LED substrate.

However, a heat dissipation function may be improved by the heat sink 60 being in contact with a reinforcing member 220 disposed at the rear cover 200 or by the reinforcing member 220 being in contact with a coupling plate 91. These will be described below.

Here, even when the heat dissipation characteristic is low due to a decreased area of the heat sink 60, because the heat sink 60 is in contact with the reinforcing member 220, or the reinforcing member 220 is in contact with the coupling plate 91, the low heat dissipation characteristic may be improved.

As described above, the heat sink 60 may be supported between the reflective sheet 40 and the rear cover 200 by being pressed by the rear cover 200, and an insertion protrusion 140 configured to protrude from the rear surface of the front chassis 100 and an insertion groove 62 provide at one side of the heat sink 60 are insertion-coupled to each other so that the heat sink 60 may be supported by the front chassis 100.

Specifically, the insertion protrusion 140 is an component configured to protrude rearward from the first supporting surface 120, and the insertion groove 62 is provided to have a size corresponding to a size of the insertion protrusion 140 so that the insertion groove 62 may be pressed toward the insertion protrusion 140 and insertion-coupled to the insertion protrusion 140.

Accordingly, the heat sink 60 may be primarily supported by the front chassis 100 by being pressed by the rear cover 200 and secondarily supported by the front chassis 100 by the insertion protrusion 140 and the insertion groove 62 being insertion-coupled to each other.

Hereinafter, the rear cover 200 and some components coupled to the rear cover 200 will be described in detail.

Figure 9:
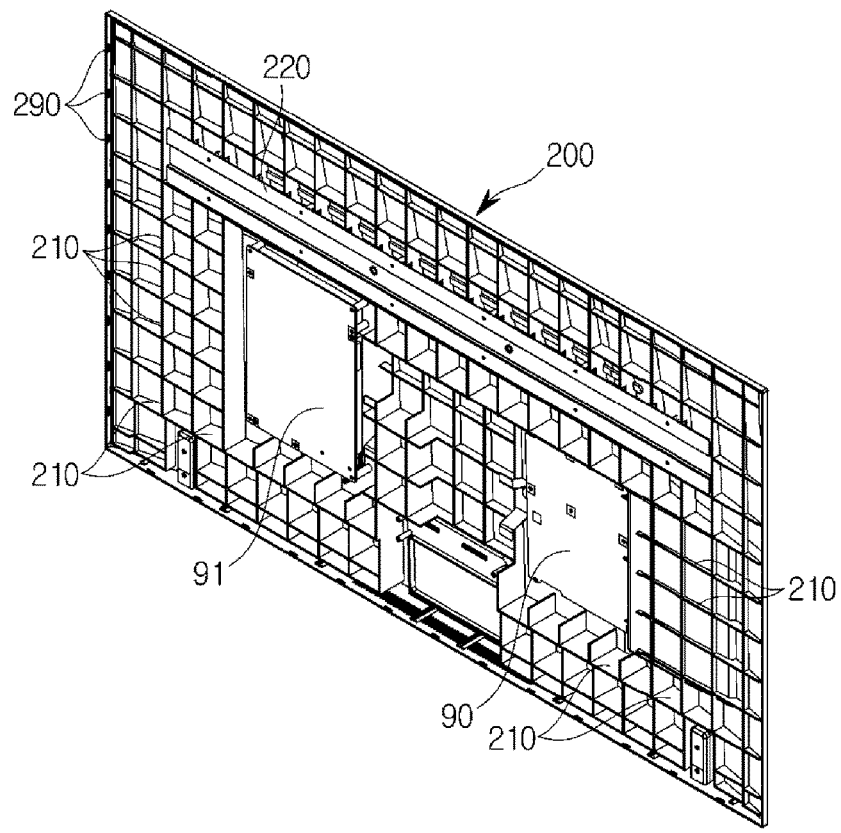
FIG. 9 is a perspective view of an exemplary rear cover and a part of the structure of a display device according to an embodiment of the present invention.
Figure 10:
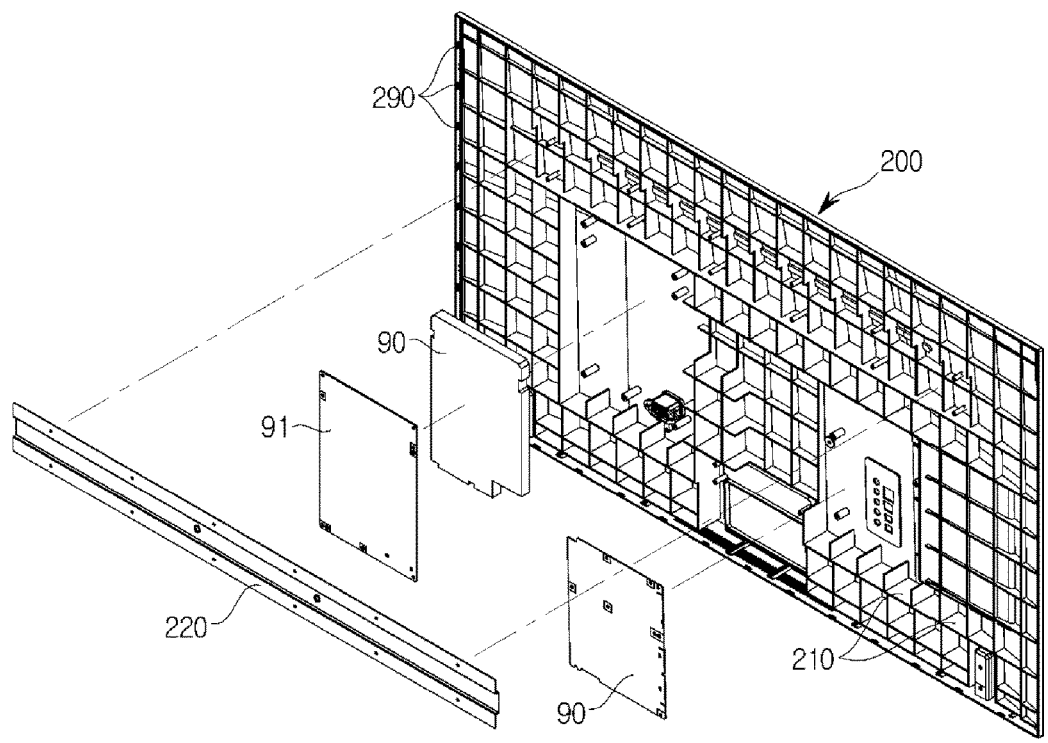
FIG. 10 is an exploded perspective view of an exemplary rear cover and a partial configuration of a display device according to an embodiment of the present invention.
Figure 11:
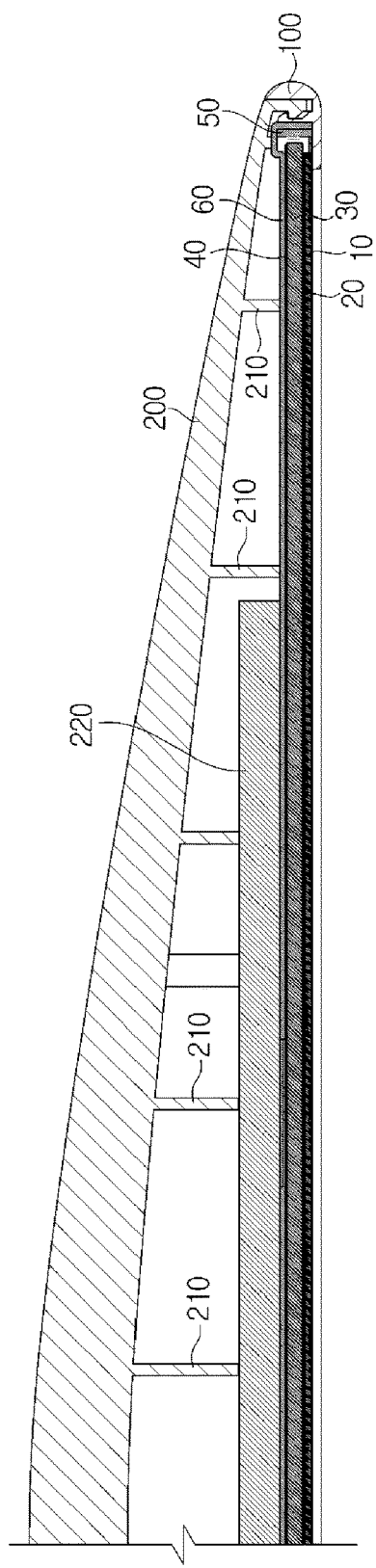
FIG. 11 is a side cross-sectional view along the line I2-I2 shown in FIG. 1.

FIG. 9 is a perspective view illustrating an exemplary rear cover and some components of the display apparatus according to an exemplary embodiment, FIG. 10 is an exploded perspective view illustrating an exemplary rear cover and some components of the display apparatus according to an exemplary embodiment of the present disclosure, and FIG. 11 is a cross-sectional side view taken along line I2-I2' of FIG. 1.

As described above, the rear cover 200 is coupled to the front chassis 100, and may allow components such as the display panel 10, the optical sheet 20, and the light guide plate 30 to be supported from an inside of the display apparatus even without a middle mold or a rear chassis by pressing the components disposed between the front chassis 100 and the rear cover 200 toward the front chassis 100.

The rear cover 200 may be formed of a plastic material. In particular, the rear cover 200 may be formed exclusively of a plastic material (i.e., polymer, synthetic compound, etc.). Alternatively, the rear cover 200 may be formed as a mixture of plastic and a non-plastic material. The rear cover 200 may be made from a different material than the front chassis 100. In particular, the rear cover 200 may be made from a material that is lighter than the front chassis 100. Accordingly, the rear cover 200 may have relatively low durability, and the reinforcing member 220 may be coupled to the rear cover 200 to compensate for the low durability. In addition, the plurality of ribs 210 are provided to intersect each other to improve strength of the rear cover 200.

The plurality of ribs 210 may be provided to protrude forward from the rear cover 200. Although the plurality of ribs 210 are provided to press components such as the display panel 10, the optical sheet 20, and the light guide plate 30 disposed in front of the rear cover 200 toward the front chassis 100, the plurality of ribs 210 may also serve to improve the strength of the rear cover 200 as described above.

As illustrated in FIG. 9, the plurality of ribs 210 may be formed to intersect each other, but are not limited thereto, and may protrude in various patterns. One end of each of the plurality of ribs 210 may be in contact with the reflective sheet 40, the light guide plate 30, or the heat sink 60, and the plurality of ribs 210 may be pressed forward in conjunction therewith when the rear cover 200 is hook-coupled to the front chassis 100 so that the ends of the plurality of ribs 210 may press the reflective sheet 40, the light guide plate 30, or the heat sink 60 forward.

The reinforcing member 220 may extend to correspond to a longitudinal direction of the rear cover 200. The display apparatus 1 may extend in a lateral direction. The reinforcing member 220 may be formed of a metallic material to be stronger than the rear cover 200 formed of a plastic material. The reinforcing member 220 may be preferably formed of aluminum similar to the heat sink 60. The reinforcing member 220 may have one of various shapes, such as a plate, a bar, a rod, a lattice, a rectangle, etc., or a combination of these shapes.

The reinforcing member 220 may be disposed in front of the rear cover 200. In addition, as illustrated in FIG. 11, one side of the reinforcing member 220 may be disposed to be in contact with the heat sink 60 to receive heat from the heat sink 60 and further improve a heat dissipation effect thereof.

Because the heat dissipation effect of the heat sink 60 is improved by the reinforcing member 220, the size of the heat sink 60 may be further reduced, thereby achieving an even lower cost of manufacturing the display apparatus 1.

An electrical component substrate 90 on which electrical components configured to control the display apparatus 1 are mounted may be disposed in front of the rear cover 200. In a conventional display apparatus, an electrical component substrate is disposed at a rear chassis formed of aluminum, but the electrical component substrate 90 may be disposed at the rear cover 200 according to an aspect of an exemplary embodiment of the present disclosure.

The coupling plate 91 in contact with the electrical component substrate 90 and coupled to the rear cover 200 may be provided at one side of the electrical component substrate 90. As described above, an electrical component substrate is conventionally disposed at a rear chassis so that the heat generated by the electrical component substrate may be dissipated by the rear chassis. However, because exemplary embodiments of the present disclosure exclude a rear chassis, the coupling plate 91 may be additionally included to dissipate heat generated by the electrical component substrate 90. The coupling plate 91 may be formed of a metallic material such as aluminum like the heat sink 60 or the reinforcing member 220.

In addition, harmful radio waves are generated by various electrical components mounted on the electrical component substrate 90, and particularly, electromagnetic interference (EMI) generated by the harmful radio waves may be a problem. EMI may cause malfunctions in the electrical components or external electronic systems, and because electromagnetic waves are harmful to a human body, the amount of EMI may be regulated by various standard organizations or regulatory bodies.

In a conventional display apparatus, a rear chassis formed of aluminum serves to prevent emission of electromagnetic waves, but because exemplary embodiments of the present disclosure excludes a rear chassis, the coupling plate 91 may be provided to be in contact with the electrical component substrate 90 to serve to block the electromagnetic waves.

Accordingly, the coupling plate 91 may be formed in a plate shape as shown in FIG. 10, but is not limited thereto, and may also be formed in a shield can shape configured to cover the electrical component substrate 90.

Hereinafter, a rear cover 200' according to an aspect of an exemplary embodiment will be described. Because components except for the rear cover 200', which will be described below, are the same as the components according to one embodiment illustrated in FIGS. 1 to 11, description thereof will be omitted.

Figure 12:
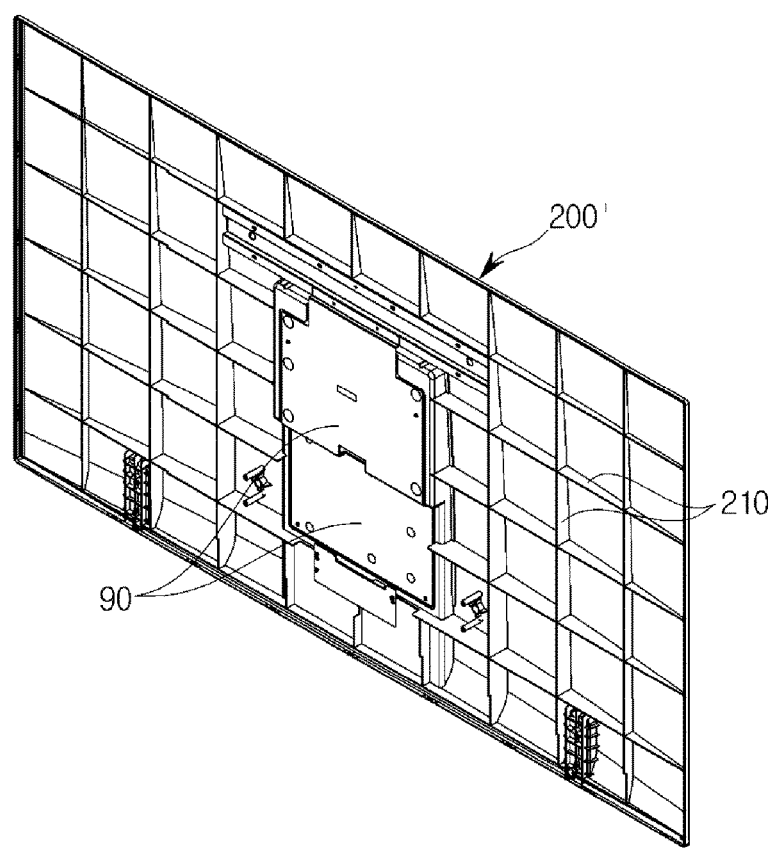
FIG. 12 is a perspective view of exemplary rear cover and a part of the structure of a display device according to an exemplary embodiment.
Figure 13:
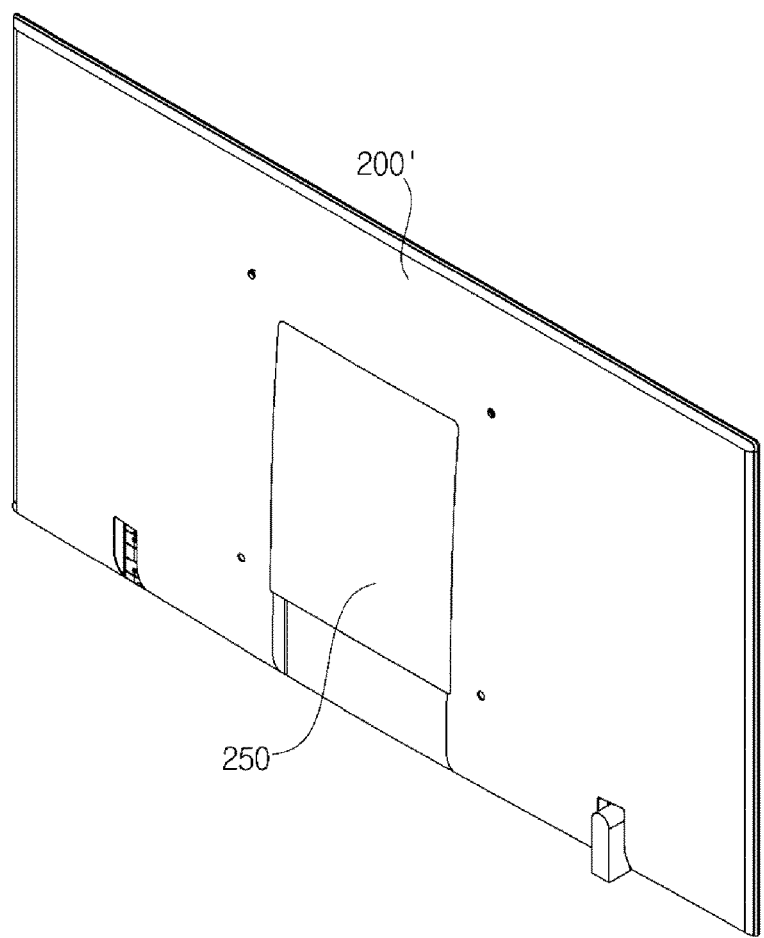
FIG. 13 is a rear side perspective view of an exemplary rear cover of a display device according to an exemplary embodiment.
Figure 14:
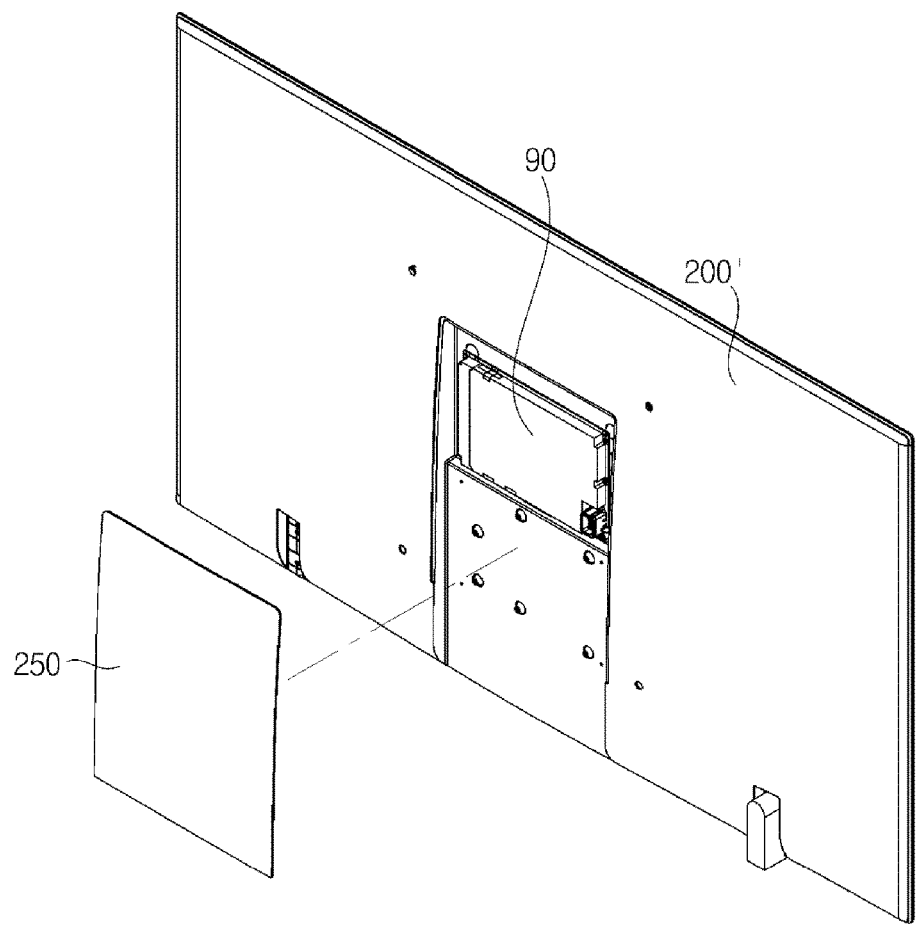
FIG. 14 is an exploded rear perspective view of an exemplary rear cover and a partial configuration of a display device according to an exemplary embodiment.

FIG. 12 is a perspective view illustrating an exemplary rear cover and some components of a display apparatus according to an exemplary embodiment, FIG. 13 is a perspective view illustrating a rear surface of an exemplary rear cover of the display apparatus according to an exemplary embodiment of the present disclosure, and FIG. 14 is an exploded perspective view illustrating the rear surface of an exemplary rear cover of the display apparatus according to an exemplary embodiment.

An electrical component substrate 90 may be disposed behind the rear cover 200' so that assembly in an assembly process of a display apparatus 1 is facilitated.

A recessed space capable of accommodating the electrical component substrate 90 may be provided at a rear surface of the rear cover 200', the electrical component substrate 90 may be disposed in the recessed space, and an auxiliary cover 250 configured to cover the electrical component substrate 90 may be provided so that the electrical component substrate 90 is not exposed to the outside.

A coupling plate 91 coupled to the electrical component substrate 90 may be provided in front of the rear cover 200' to dissipate heat generated by the electrical component substrate 90 while absorbing electromagnetic waves as described above.

Specifically, the electrical component substrate 90 may be coupled to the coupling plate 91 behind the rear cover 200'. The coupling plate 91 is disposed to be exposed to the rear of the rear cover 200' to be in direct contact with the electrical component substrate 90. That is, because an opening may be formed at the rear cover 200' and the coupling plate 91 is disposed in the opening, the electrical component substrate 90 may be coupled to the coupling plate 91 even when disposed behind the rear cover 200'. The electrical component substrate 90 may be coupled to the coupling plate 91 by being screw-coupled or the like.

The coupling plate 91 and the electrical component substrate 90, which may be exposed to the outside by the opening of the rear cover 200', are covered by the auxiliary cover 250 described above and finally may not be exposed to the outside as a result.

Hereinafter, a coupling plate 91' according to another embodiment of the present disclosure will be described. Because components except for the coupling plate 91', which will be described below, are the same as the components according to one embodiment illustrated in FIGS. 1 to 11, description thereof will be omitted.

Figure 15:
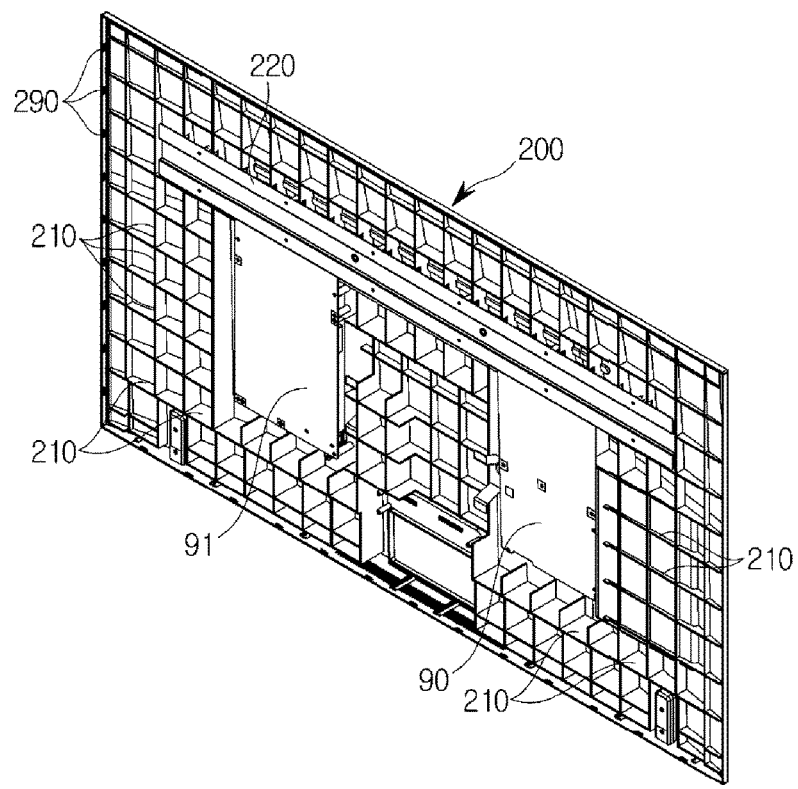
FIG. 15 is a perspective view of an exemplary rear cover and a part of the structure of a display device according to an exemplary embodiment.
Figure 16:
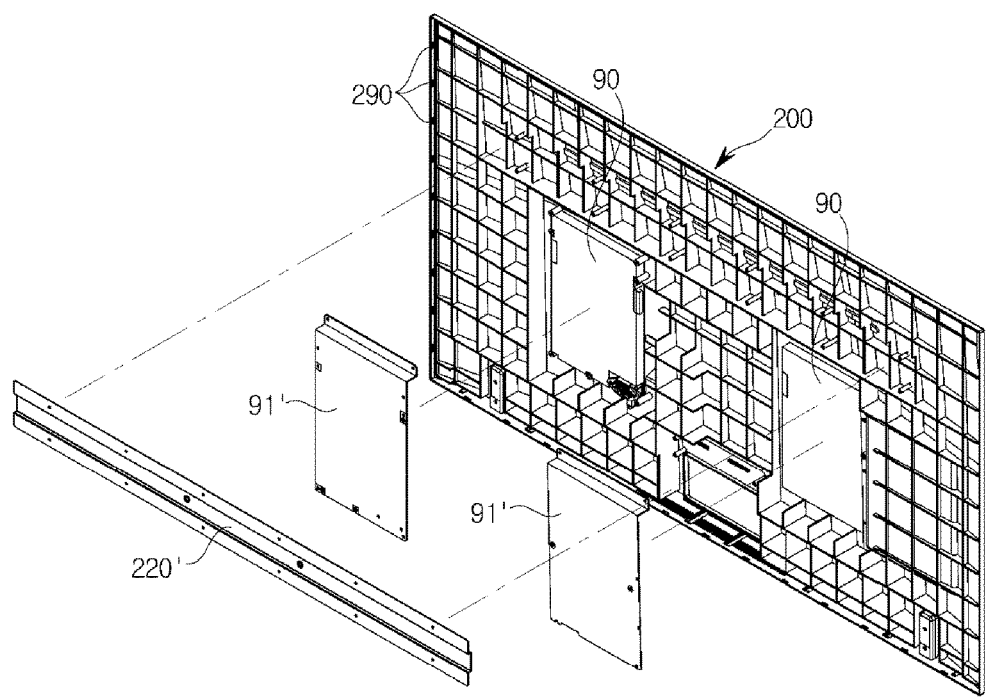
FIG. 16 is an exploded perspective view of an exemplary rear cover and a partial configuration of a display device according to an exemplary embodiment.

FIG. 15 is a perspective view illustrating an exemplary rear cover and some components of a display apparatus according to an exemplary embodiment, and FIG. 16 is an exploded perspective view illustrating an exemplary rear cover and some components of the display apparatus according to an exemplary embodiment.

The coupling plate 91' may be disposed to be in simultaneous contact with an electrical component substrate 90 and a reinforcing member 220. A contact portion configured to be in contact with the reinforcing member 220 may be provided at one end of the coupling plate 91' adjacent to the reinforcing member 220.

According to an aspect of an exemplary embodiment, the contact portion is disposed to be bent at the one end of the coupling plate 91' to be in contact with a rear surface of the reinforcing member 220, and may be coupled to the rear cover 200 when the reinforcing member 220 is coupled to the rear cover 200 by being screw-coupled or the like.

As illustrated in FIG. 15, because the number of the coupling plates 91' may correspond to the number of electrical component substrates 90, the coupling plates 91' may be disposed on the electrical component substrates 90. Two electrical component substrates 90 are provided and two coupling plates 91' are thus provided according to an aspect of an exemplary embodiment, but the coupling plates 91' are not limited thereto, and the plurality of coupling plates 91' may be provided according to the number of electrical component substrates 90.

Because the coupling plate 91' is provided to be in contact with the reinforcing member 220, heat is transmitted to the reinforcing member 220 as described above, and thus heat dissipation may be improved. In addition, because the amount of electromagnetic waves being absorbed is increased, electromagnetic waves may be shielded more effectively.

In addition, as illustrated in FIG. 11, because the reinforcing member 220 is also connected to a heat sink 60, the coupling plate 91' is connected to the reinforcing member 220 and the heat sink 60, heat dissipation and electromagnetic blocking can be improved.

Although not illustrated in the drawings, because the coupling plate 91' is provided to extend to a side at which the heat sink 60 is disposed, the coupling plate 91' may be directly connected to the heat sink 60. In addition, a connection member formed of a metallic material may be provided between the coupling plate 91' and the reinforcing member 220 or the coupling plate 91' and the heat sink 60 to connect the coupling plate 91' and the reinforcing member 220 or the coupling plate 91', the reinforcing member 220, and heat sink 60.

As is apparent from the above description, in a display apparatus according to exemplary embodiments of the present disclosure, a thickness of the display apparatus can be reduced because the display apparatus may dispense with a middle mold and a rear chassis, and as a result, a manufacturing cost thereof is reduced.

In addition, even though there is no rear chassis, a display apparatus according to exemplary embodiments of the present disclosure can effectively dissipate heat generated in an LED substrate by including a heat sink.

The present disclosure is not limited to the above-described exemplary embodiments, and it should be clear to those skilled in the art that various modifications and changes may be made without departing from the scope of the present disclosure. Therefore, modified or changed embodiments are included in the range of the claims of the present disclosure.

What is claimed is:

1. A display apparatus comprising:
a display panel;
a front chassis provided in front of the display panel;
an optical sheet disposed behind the display panel and supported by the front chassis;
a light guide plate disposed behind the optical sheet;
a light emitting diode (LED) substrate disposed beside the light guide plate and configured to emit light toward the light guide plate;
a rear cover configured to form an exterior of the display panel, the rear cover being coupled to a rear side of the front chassis, and configured to press the light guide plate toward the front chassis;
a reinforcing plate coupled to the rear cover to reinforce strength of the rear cover, and
a heat sink connected to the LED substrate to dissipate heat generated by the LED substrate and disposed between the light guide plate and the rear cover,
wherein the heat sink is in direct contact with and supported by the front chassis, and
wherein at least one side of the reinforcing plate is configured to be in contact with the heat sink.

2. The display apparatus of claim 1, wherein the rear cover comprises a plastic material.

3. The display apparatus of claim 2, wherein an area of the heat sink is smaller than that of the light guide plate.

4. The display apparatus of claim 1, wherein the heat sink is provided in a plate shape having a first dimension extending in a direction corresponding to a longitudinal direction of the LED substrate and a second dimension having a shorter length than the first dimension.

5. The display apparatus of claim 1, wherein the rear cover comprises a plurality of ribs configured to protrude toward the front chassis and press the light guide plate toward the front chassis so that the light guide plate is supported by the front chassis.

6. The display apparatus of claim 1, wherein:
the front chassis comprises a hook configured to protrude toward the optical sheet to fasten the optical sheet; and
the optical sheet comprises a hook hole to accommodate the hook.

7. The display apparatus of claim 6, further comprising a reflective sheet provided behind the light guide plate,
wherein the reflective sheet is hooked by the hook and supported by the front chassis.

8. The display apparatus of claim 1, wherein:
the front chassis comprises a light guide plate support configured to protrude toward the light guide plate and support the light guide plate,
wherein the light guide plate support protrudes to a length corresponding to a combined thickness of the display panel and the optical sheet.

9. The display apparatus of claim 1, wherein:
the front chassis comprises an insertion protrusion configured to protrude toward the heat sink and support the heat sink; and
the heat sink comprises an insertion groove to accommodate the insertion protrusion for coupling the heat sink to the front chassis.

10. The display apparatus of claim 1, further comprising an electrical component substrate on which an electrical component is mounted,
wherein the electrical component substrate is coupled to the rear cover.

11. The display apparatus of claim 10, wherein a coupling plate provided to have an area corresponding to that of the electrical component substrate is provided at one side of the electrical component substrate.

12. The display apparatus of claim 11, wherein the coupling plate is connected to the heat sink.

13. The display apparatus of claim 10, wherein the electrical component substrate is disposed between the light guide plate and the rear cover.

14. The display apparatus of claim 10, wherein:
the electrical component substrate is disposed behind the rear cover; and
the rear cover includes an auxiliary cover configured to cover the electrical component substrate.

15. A display apparatus comprising:
a display panel;
a front chassis provided in front of the display panel;
a rear cover provided behind the display panel and coupled to the front chassis;
an optical sheet and a light guide plate provided between and supported by the front chassis and the rear cover;
a light emitting diode (LED) substrate disposed beside the light guide plate and configured to emit light toward the light guide plate;
a heat sink connected to the LED substrate to dissipate heat generated by the LED substrate, the heat sink being in direct contact with and supported by the front chassis; and
a reinforcing plate coupled to the rear cover and connected to the heat sink to reinforce strength of the rear cover.

16. The display apparatus of claim 15, further comprising an electrical component substrate coupled to the rear cover, wherein:
an electrical component is mounted on the electrical component substrate; and
a coupling plate configured to reduce electromagnetic waves generated by the electrical component substrate is disposed at one side of the electrical component substrate.

17. The display apparatus of claim 16, wherein the coupling plate is connected to at least one of the heat sink and the reinforcing plate.

18. The display apparatus of claim 15, wherein the front chassis and the rear cover are coupled to each other via a hook.

19. A display device comprising:
   a display panel;
   an optical sheet disposed behind and in direct contact with the display panel;
   a light guide plate disposed behind and in direct contact with the display panel;
   a reflective sheet disposed behind and in direct contact with the light guide plate;
   a heat sink disposed behind and in direct contact with the reflective sheet;
   a front bezel disposed in front of the display panel, the front bezel covering edges of the display panel;
   a rear cover disposed behind and in direct contact with the heat sink, the rear cover being configured to apply a pressure to the display panel, the optical sheet, the light guide plate, the reflective sheet, and the heat sink toward the front bezel;
   a reinforcing plate coupled to the rear cover to reinforce strength of the rear cover,
   wherein the heat sink is in direct contact with and supported by the front bezel, and
   wherein at least one side of the reinforcing plate is configured to be in contact with the heat sink.

* * * * *